T. F. BRABSON.
Cartridge-Boxes.

No. 138,847.

Patented May 13, 1873.

Witnesses.
Ernst Bilhuber
Chas. Wahlers.

Inventor.
Thomas F. Brabson
Van Santvoord & Hauff
Attys

UNITED STATES PATENT OFFICE.

THOMAS F. BRABSON, OF BROOKLYN, E. D., NEW YORK.

IMPROVEMENT IN CARTRIDGE-BOXES.

Specification forming part of Letters Patent No. 138,847, dated May 13, 1873; application filed April 9, 1873.

*To all whom it may concern:*

Be it known that I, THOMAS F. BRABSON, of Brooklyn, E. D., in the county of Kings and State of New York, have invented a new and useful Improvement in Cartridge-Boxes; and I do hereby declare the following to be a full, clear, and exact description thereof, which will enable those skilled in the art to make and use the same, reference being had to the accompanying drawing forming part of this specification, in which drawing—

Figure 1:
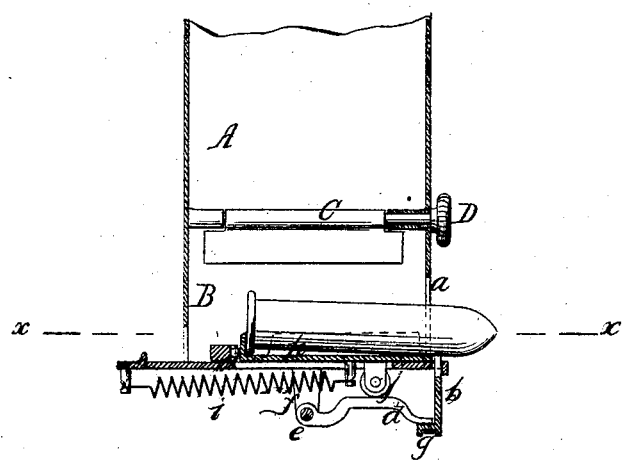
Figure 2:
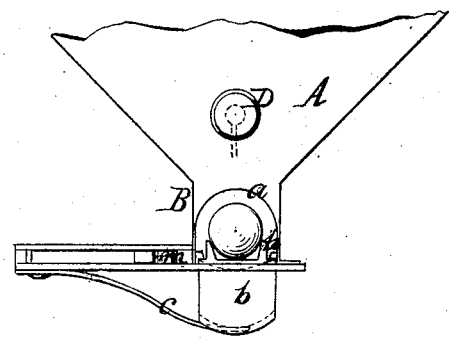
Figure 3:
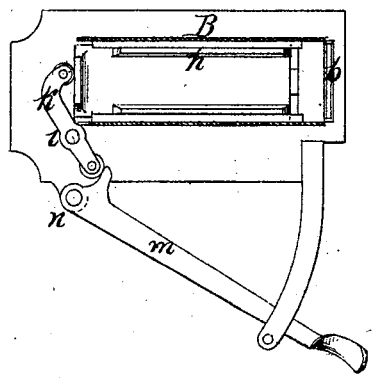

Figure 1 represents a transverse vertical section of this invention. Fig. 2 is an end view of the same. Fig. 3 is a horizontal section of the same in the plane $x\,x$, Fig. 1.

Similar letters indicate corresponding parts.

This invention relates to a cartridge-box, which is made with inclined sides leading to a trough which is provided in one end with a discharge-opening closed by a gate that connects with a lever, which also serves to operate the ejector situated in the bottom of said trough in such a manner that whenever the discharge-lever is moved in the proper direction the gate is opened, and by the action of the ejector one of the cartridges contained in the box is thrown out, and when the discharge-lever is released the gate closes and the ejector returns to its original position ready for a subsequent operation.

In the drawing, the letter A designates my cartridge-box, which is provided with inclined sides leading down to a trough, B, that is just wide enough to admit one cartridge at a time. In one end of this trough is a discharge-opening, $a$, which is closed by a gate, $b$, that slides up and down in a guide-slot in the bottom of the box. Said gate is subjected to the action of a spring, $c$, (see Fig. 2,) which has a tendency to force the same upward to its closing position, and it is depressed or opened by a cam-lever, $d$, which has its fulcrum on a pivot, $e$, secured in lugs $f$ which project from the bottom plate, said cam-lever being made to bear on a lip, $g$, formed on the gate, as shown in Fig. 1. On the inner surface of the bottom plate are formed guideways to receive the ejector $h$, which is so constructed that it receives one cartridge at a time, and to which is hitched a spring, $i$, that has a tendency to pull the same clear back. From the bottom surface of the ejector projects a roller-stud, $j$, which acts on the gate-lever $d$. The ejector is thrown forward by the action of a lever, $k$, which turns on a pivot, $l$, secured in the bottom-plate, and which is acted upon by a trigger, $m$, that has its fulcrum on a pivot, $n$, and is guided in a slotted segment, $o$, projecting from the bottom plate. When this trigger is moved into the position shown in 2, the gate is opened, and, at the same time, the ejector is moved forward so as to throw the cartridge resting on it out through the discharge-opening into the hand which operates the trigger. When the trigger is released the ejector and the gate are both carried back to their original position, and another cartridge rolls down into the ejector ready to be discharged. In the interior of the box, above the trough B, is placed an agitator, C, which can be operated by a milled head, D, and which serves to stir up the cartridges whenever they become jammed in the box.

By this arrangement a cartridge-box is obtained, which is particularly adapted for metallic cartridges. The box, after having been charged, remains firmly closed, and the cartridges are successively discharged without allowing any of them to become lost.

It is obvious that the whole mechanism, as above described, can be readily inclosed in a covering of leather or other suitable material, and that my cartridge-box, when finished, must also be furnished with suitable straps or fastenings, so that it can be secured to the body of the soldier in the proper position.

What I claim as new, and desire to secure by Letters Patent, is—

The combination of the ejector $h$ and gate $b$ with a cartridge-box A, both the ejector and the gate being operated by a trigger, $m$, substantially in the manner herein shown and described.

This specification signed by me this 12th day of March, 1873.

THOMAS FREDERICK BRABSON.

Witnesses:
    W. HAUFF,
    E. F. KASTENHUBER.